F. C. WEIR.

Railroad-Frog.

No. 8,914. Reissued Sept. 30, 1879.

Attest

John S. Jones

Geo. Cook

Inventor

Frederick C. Weir

N. PETERS, PHOTO-LITHOGRAPHER, WASHINGTON, D.C.

UNITED STATES PATENT OFFICE.

FREDERIC C. WEIR, OF CINCINNATI, OHIO.

IMPROVEMENT IN RAILROAD-FROGS.

Specification forming part of Letters Patent No. 215,548, dated May 20, 1879; Reissue No. 8,914, dated September 30, 1879; application filed July 14, 1879.

DIVISION A.

*To all whom it may concern:*

Be it known that I, FREDERIC C. WEIR, of Cincinnati, Hamilton county, State of Ohio, have invented an Improvement in Railroad-Frogs, of which the following is a specification.

My invention relates to the class of frogs made by the bending of the overlapping ends of the rails themselves, and the junction of the same with the central rails constituting the point by rivets or bolts through separating-pieces; and my invention consists, first, in such a formation and connection of the two rails which make up the angular point as that one of the rails extends unbroken and uncut directly across the path of the other, and in itself makes a solid end to the point, with a full-width flange, which is overlapped by the flange of the other rail, and thus a flange of double thickness is afforded at a point where strength is particularly needed, and the cutting away of the flanges (as is the usual custom) is avoided entirely; second, in an improved manner of connecting the two rails of the point together, and to channel-iron pieces, to which the outer rails are connected.

One of the objects of this invention is to furnish a firm lateral support upon each side of the V-shaped rails by means of channel-irons, which at the same time unite and hold the center rails forming the V to the wing-rails firmly, uniting and holding all the parts in their proper relative position.

Figure 3:
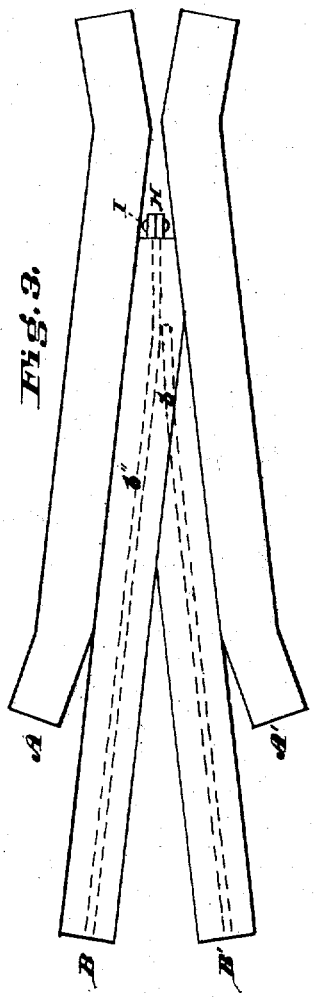
Figure 4:
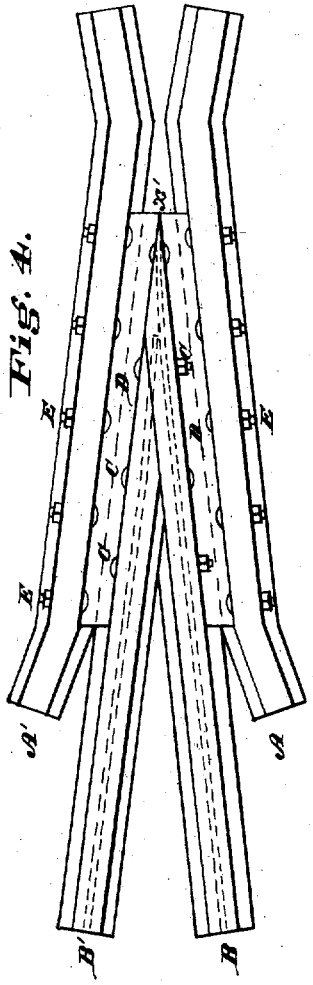
Figure 5:
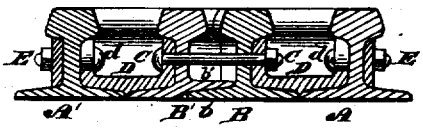

In the accompanying drawings, Figure 4 is a plan of a frog embodying my improvements. Fig. 5 is a cross-section of the same on line *x x*. Fig. 3 is a plan of the under side of the frog, showing the continuations of the main point-rail with a full-width flange throughout, also showing the riveted extension of the flanges of the channel-irons beyond the points.

Figure 1:
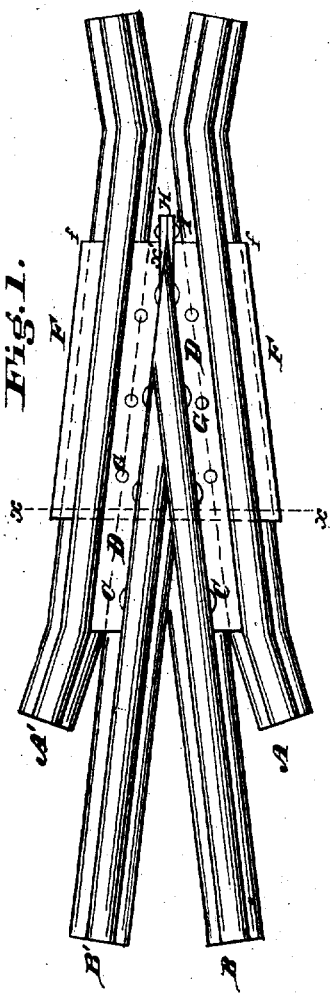
Figure 2:
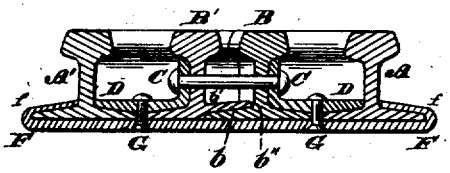

It will not be necessary to describe the devices shown in Figs. 1 and 2, as they are fully described in Division B of this reissue.

A A′ are the outer or wing rails of the frog, and B B′ are the two rails which compose the acute angle or point.

In place of cutting away both the flanges of the rails B B′, so as to make a joint between the two rails midway between the lines of the angle of the frog, as is common now, and I may say usually practiced, I continue the flange of the rail B of full width intact clear along the junction of the two rails to the point where it strikes the flange of the outer rail, as shown in Fig. 3, which is almost immediately under the point X′ of the frog, and I swage up the flange $b^1$ of rail B′ on one side, as shown in Figs. 5 and 3, so that it lies over the flange of rail B, this flange of rail B′ being cut away angularly on the edge to properly meet the line of the web $b^2$ of the rail B.

I connect the point-rails B B′ together by rivets C, which, while they secure these rails together, also secure pieces of channel-iron D to said point-rails, the channel-iron making the separating medium between the point-rails B B′ and wing-rails A A′, and giving a means for attaching said wing-rails.

The adjacent flanges of the channel-irons of the point may be extended beyond the point and riveted, as shown in Fig. 3.

With channel-iron I attach the wing-rails in the manner shown in Fig. 5, the outer flanges of the iron being notched at *d* for the passage, before the outer rails are attached, of the long rivets C, the bolts E, which connect the outer rails, being placed between the notches *d*.

I claim—

1. A frog having one of its point-rails extending with a full-width flange along the junction of the two rails, and the flange of the other point-rail overlying the flange of the first-mentioned one, substantially as and for the purpose specified.

2. A frog composed substantially of the two center rails, B B′, joined to form the V-shape point, united to outside diverging or wing rails by means of two channel or U irons, D D, one wing of which channel or U iron is shaped to fit the web of the abutting-rails, combined to form the point of the frog, and upon the other side fitting the web of the wing or diverging rail, respectively, and secured by bolts or rivets passing through the webs of the rails and the sides of the channel-bars, substantially as shown.

3. In combination with the point-rails B B′, fitted to each other, as described, the channel-pieces D, extending and bolted or riveted together beyond the point of the frog, and connecting-rivets C, which extend entirely through the two point-rails and the channel-pieces, substantially as and for the purpose specified.

In testimony of this invention I herewith set my hand.

FREDERIC C. WEIR.

Witnesses:
JOHN B. CONNELLY,
GEO. COOK.